INVENTOR.
CHARLES W. WEBSTER
BY
PAUL & PAUL
ATTORNEYS

United States Patent Office 3,153,421
Patented Oct. 20, 1964

3,153,421
HIGH PRESSURE SOFT SEAT VALVE
Charles W. Webster, Hatboro, Pa., assignor to Tri-Kris Company, Inc., Lansdale, Pa., a company of Pennsylvania
Filed Sept. 18, 1962, Ser. No. 224,316
1 Claim. (Cl. 137—315)

This invention relates generally to high pressure valves. More particularly, this invention relates to needle type valves for the control of fluids under pressure wherein the tapered pin thereof rests in a relatively soft, deformable seat.

Needle type valves having a resilient, deformable valve seat are particularly useful in industry for regulating the flow of fluids under pressure, especially in the operation of sensitive instruments which may themselves be damaged by an excessive pressure during the operation thereof. In such valves, the plastic deformable seat substantially absorbs the tremendous pressures frequently exerted on the valve by the operator in closing the valve. As a consequence of excess torque frequently applied by the operator to ensure that the valve is closed so that delicate equipment connected thereto may not be damaged or destroyed, the soft seat of the valve is frequently rather quickly ruined, thereby causing the valve to leak. In such circumstances it is eminently desirable to replace the soft seat of the valve with a minimum of difficulty and expenditure of time in order that the valve may be restored to operating condition without delay. In the past, a practical difficulty standing in the way of a rapid restoration of the valve to normal operating condition has frequently been encountered in the complex construction thereof which has rendered parts inaccessible and difficult and time-consuming to disassemble. Another disadvantage of conventional valves of the kind referred to frequently resides in the disposition of the torquing threads of the stem thereof, so that when the valve is used with corrosive or eroding fluids, the threads of the valve are exposed to the deleterious action thereof, thereby becoming rapidly corroded, rendering the valve inoperative and necessitating the replacement thereof.

Accordingly, it is an object of the present invention to provide an improved high pressure valve which is easy and simple to disassemble for replacement of the valve seat therein and wherein, at the same time, the torquing threads of the valve are fully protected from the corroding or otherwise deleterious reagents which may be used in connection therewith.

It is another object of this invention to provide in a needle valve for use with fluids under pressure improved soft seat means whereby less torque is required to close the valve, thereby assuring the efficient and rapid closure thereof.

Other objects and attendant advantages of the invention will become apparent hereinafter in the description thereof and in the drawings wherein.

Figures 1, 2:
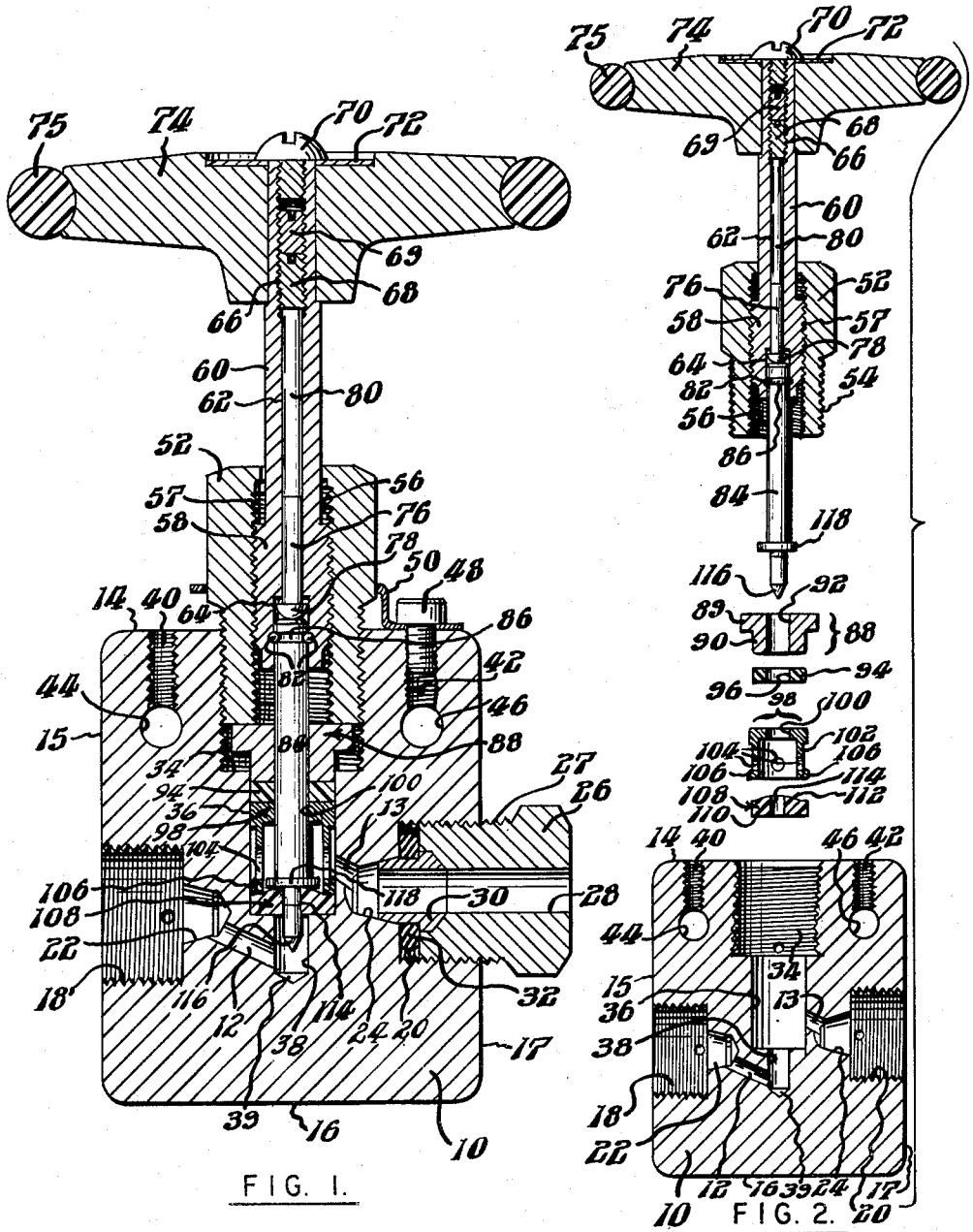
FIG. 1 is a view in cross section of a fully assembled valve as provided in accordance with this invention.
FIG. 2 is an exploded view in section of the valve.

The following description is directed to the specific form of the invention illustrated in the drawings and is not intended to limit the scope of the invention itself which may be practiced in a wide variety of forms and arrangements.

Adverting herewith to the specific form of the invention illustrated in the drawings, there is shown in FIG. 1 a high pressure valve having a valve body 10 which is machined to provide a fluid inlet 12 and a fluid outlet 13 which extend in substantially parallel relation slantwise to the outer rectangular surfaces 14, 15, 16 and 17 of the valve body 10. As may be clearly seen in FIG. 2 threaded bores 18 and 20 are respectively sunk into the valve body 10 from the respective opposite sides 15 and 17 thereof each of which respectively have generally conical counterbores 22 and 24 sunk into the valve body 10 at the inner ends thereof. The counterbore 22 communicates with the inlet 12 and the counterbore 24 communicates with the outlet 13. As may be seen in FIG. 1, each of the threaded bores 18 and 20 is adapted to receive a correspondingly dimensioned gland nut 26 having exterior threads 27 disposed on the outer surface thereof and a smooth cylindrical bore 28 extending axially therethrough. Seated in the end of the gland nut 26 is a tapered sleeve 30 dimensioned to fit the conical counterbores 22 and 24 and arranged for the retention of a packing gland 32 which seals the inlet and outlet of the valve body.

Machined into the valve body from the top side 14 thereof is a threaded bore 34 which is followed by a substantially smooth-walled cylindrical counterbores 36 and a second cylindrical counterbore 38 all of which bores are vertically disposed in the valve body 10 and the last of which terminates in a generally conical portion 39. Two additional bores 40 and 42 are sunk into the valve body 10 from the top side 14 thereof to communicate with smooth walled bores 44 and 46 machined transversely through the valve body 10 and having their axes parallel to the opposite sides 15 and 17 and 14 and 16 thereof. The threaded bores 40 and 42 are dimensioned to receive a lock screw 48 which secures a retainer element 50 for a purpose to be explained more fully hereinafter.

A gland nut 52 having a diametrically reduced threaded portion 54 dimensioned to be received in the threaded bore 34 of the valve body 10 is provided with an axial bore 56 having interior threads 57 adapted to engage the exterior threads of a diametrically enlarged portion 58 of a valve shank 60. A smooth-walled bore 62 is provided axially in the shank 60 which terminates in a wider counterbore 64 at the lower end thereof. At the top end of the shank, the bore 62 is provided with threads 66 which engage a suitably dimensioned set screw 68 and a lock screw 69 positioned immediately above the set screw 68 in the bore. A suitably dimensioned mounting screw 70 is also engaged by the threads 66 of the shank 60, which screw abuts a washer 72 and secures a generally circular handle 74 to the top of the shank 60. Mounted circumferentially to the handle 74 is a neoprene annulus 75. Extending longitudinally within the smooth bore 62 of the shank 60 is the body of a shank insert 76 having a hemispherical head 78 of wider dimension positioned in the counterbore 64. Above the shank insert 76 in the bore 62 there is lodged a shank insert extension 80. Beneath the hemispherical head 78 of the shank insert 76 bearings 82 mounted in grooves provided for that purpose in the wall of the counterbore 64, support a valve stem 84 having a circumferential groove 86 near the top thereof for the reception of the aforesaid bearings 82.

An external washer 88 having an upper portion 89 of wider diameter and a lower portion 90 of narrower diameter is lodged in the bore 34 of the valve body 10 beneath the gland nut 52 and extends in its narrower portion 90 into the counterbore 36 of the valve body. The washer 88 is provided with an axial opening 92 dimensioned to receive the cylindrical stem 84. Immediately beneath the washer 88 is a plastic packing gland 94, preferably of nylon, likewise having an axial opening 96 dimensioned to receive the stem 84. Immediately beneath the packing gland 94 is positioned a retainer element 98 having an opening 100 in the top thereof dimensioned to receive the stem 84 and vertical walls 102 extending longitudinally in the counterbore 36 and having holes or openings 104 drilled therein for the passage of fluid therethrough. The longitudinally extending walls 102 of the retainer element 98 have slight outwardly extending flanges 106 at the bottom thereof which abut a soft valve seat element 108 having a substantially flat bottom surface 110 and a curved top surface 112 which is slightly flattened at the extreme edges thereof. The soft valve seat 108 is annular in shape having an axial opening 114 dimensioned to receive a pointed, generally needle-shaped tip or pin 116 forming the distal end of the valve stem 84 and diametrically reduced in relation to the body of the stem. Formed integrally with the stem 84 between the tip 116 thereof and the diametrically greater body thereof is a circular disc 118 having a diameter substantially greater than that of the stem body itself and arranged to abut the curved surface 112 of the soft seat 108. It will be seen that the gland 52, the external washer 88, the packing ring 94, the retainer element 98 and the soft seat 108 are all in an abutting relationship. It will be seen further, by reference to FIG. 1, that the circular disc 118 is of greater diameter than the opening 100 in the top part of the retainer element 98.

When the valve is assembled, the retainer 50 is secured in position against the gland nut 52 and also beneath the lock screw 48 and the lock screw 48 is tightened, thereby preventing the gland nut 52 from turning on its threads in the bore 34 of the valve body 10. Alternatively, the locking nut 48 may be used with the bore 40 on the opposite side of the valve body 10 to secure the retainer element 50 in abutting relationship with the gland nut 52. When the gland nut 52 has been adjusted and secured in position to the correct height, the assembled valve may be operated by turning the handle 74 to close or open the valve as desired. When the handle 74 is operated to open the valve the stem 84 thereof rises so that the tip 116 of the stem is raised through the soft seat 108 to a height which will permit fluid to pass through the inlet 12 into the counterbore 38 thence through the opening 114 in the soft seat into the counterbore 36, thence through the opening 104 in the retainer 98 into the outlet 13. The flow of fluid may be adjusted to a close precision by the positioning of the needle-shaped tip 116 of the stem 84 in relation to the opening 114 of the valve seat 108. When torque is applied to the shank 60 through the handle 74 to close the valve, the tip 116 extends through the opening 114 in the valve seat 108 and the circular disc 118 comes into contact with the curved surface 112 of the valve seat 108, thereby tending to compress the valve seat. It will be appreciated that because of the curvature of the top surface of the valve seat 108 the circular disc is not in contact with the entire surface thereof upon initiating closure of the valve and therefore the pressure applied by the torque used is greater than were the effort to be applied across a larger area. Moreover, the compression of the deformable seat tends to lock the seat into place in the seat retainer.

In the practice of the present invention should the soft seat 108 become deteriorated through extensive use or excessive pressures applied thereto, it may easily be replaced by removal of the entire stem assembly from the valve body in one operation. The lock nut 48 is loosened and the retainer 50 drawn away from the gland nut 52, which latter nut is unscrewed to release it from the threaded bore 34 and thereafter the entire stem assembly is removed by pulling the handle 74 of the shank 60 upward whereupon the stem 84 is withdrawn from the valve body and carries with it the retainer element 98, the packing ring 94, and the external washer 88 which are pulled up out of the counterbore 36 and the bore 34 by the circular disc 118 adjacent the tip 116 of the stem 84. After removal of the aforesaid stem assembly the valve seat 108 may easily be removed and replaced by another after which the assembly is again inserted into the bore 34 and counterbore 36 and the gland nut 52 tightened in the bore 34 to the proper position. Thereafter the retainer 50 is positioned in place and tightened to the valve body by the lock nut 48.

It will be apparent that it is an important and advantageous feature of the valve as provided in accordance with the present invention that by reason of the novel structure thereof the entire interlocking stem assembly may be removed from the valve with ease and facility and the valve seat replaced with a minimum of delay and inconvenience, there being no difficultly accessible structural parts and all of the stem elements cooperating to enable the removal thereof in one simple operation.

Another significant feature of the invention lies in the construction of the steam assembly whereby the torquing threads of the valve disposed in the gland nut 52 and on the shank 60 are protected from the deleterious action of strong fluids by the packing gland 94, thereby avoiding exposure of the aforesaid threads to rapid corrosion which might render them inoperative.

Still another important advantage of the invention resides in the novel construction of the soft seat 108 wherein the curved surface 112 provides means whereby less torque is required to close the valve effectively and whereby the seat tends to become locked in position in the retainer element upon closure of the valve.

Although this invention has been disclosed with reference to specific forms and embodiments thereof, it will be evident that a great number of variations may be made without departing from the spirit and scope of this invention. For example, parts may be reversed, equivalent elements may be substituted for those specifically disclosed, and certain features of the invention may be used independently of other features, all without departing from the spirit and scope of this invention as defined in the appended claim.

Having thus described my invention, I claim:

A fluid flow control valve comprising in combination a body having inlet and outlet passages and a bore having an unthreaded inner section placing the inner ends of said passages in communication with each other, said unthreaded bore section being substantially larger in diameter than the inner end of said inlet passage to form an annular shoulder surrounding the same, a valve seat in the form of a resilient washer of pliable plastic material substantially the same in diameter as said unthreaded bore section removably fitted into the same and overlying said shoulder, a valve seat retainer including a hollow cylindrical body removably fitted into said unthreaded bore section, said hollow cylindrical body being apertured to place the hollow interior thereof in communication with the inner end of said outlet passage and being disposed with its lower terminal portion seated upon the outer marginal area of and surrounding an opening through said washer concentric with the inner end of said inlet passage, and a cross-axially extending wall closing the upper end of said hollow cylindrical body, a gland substantially the same in diameter as and removably fitted into said unthreaded bore section and overlying said valve seat retainer, a gland retainer substantially the same in diameter as and removably fitted into said unthreaded bore section and overlying said gland, a valve stem including an unthreaded main body portion slidably extending through aligned openings in said gland retainer, gland and the cross-axially extending wall of said valve seat retainer, a radially outwardly extending flange on said stem disposed within said valve seat retainer and seated upon the inner marginal area of said washer and adapted for engaging said wall to remove said valve seat retainer, gland and gland retainer from said valve body upon upward movement of said stem, and a terminal portion on said stem extending through said washer and into the inner end of said inlet passage, a bonnet threaded into the outer end of said bore, and means turnably mounted in said bonnet and operable for reciprocating said stem.

References Cited in the file of this patent

UNITED STATES PATENTS

| | | |
|---|---|---|
| 2,692,750 | Davis et al. | Oct. 26, 1954 |
| 2,716,421 | Bertrand | Aug. 30, 1955 |
| 2,829,860 | Garner et al. | Apr. 8, 1958 |
| 2,887,293 | Gasche | May 19, 1959 |
| 2,994,343 | Banks | Aug. 1, 1961 |
| 3,049,332 | Webster | Aug. 14, 1962 |
| 3,071,344 | Banks | Jan. 1, 1963 |

FOREIGN PATENTS

| | | |
|---|---|---|
| 170,809 | Sweden | Mar. 22, 1960 |